(12) United States Patent
Liu et al.

(10) Patent No.: US 12,135,405 B2
(45) Date of Patent: Nov. 5, 2024

(54) ELECTRICALLY-CONTROLLED DYNAMIC OPTICAL COMPONENT COMPRISING A PLANAR METASURFACE

(71) Applicant: Max-Planck-Gesellschaft zur Förderung der Wissenschaften e.V., Munich (DE)

(72) Inventors: Laura Na Liu, Stuttgart (DE); Jianxiong Li, Stuttgart (DE)

(73) Assignee: Max-Planck-Gesellschaft zur Förderung der Wissenschaften e.V., Munich (DE)

( * ) Notice: Subject to any disclaimer, the term of this patent is extended or adjusted under 35 U.S.C. 154(b) by 386 days.

(21) Appl. No.: 17/779,881

(22) PCT Filed: Nov. 13, 2020

(86) PCT No.: PCT/EP2020/082146
§ 371 (c)(1),
(2) Date: May 25, 2022

(87) PCT Pub. No.: WO2021/104902
PCT Pub. Date: Jun. 3, 2021

(65) Prior Publication Data
US 2023/0027067 A1 Jan. 26, 2023

(30) Foreign Application Priority Data
Nov. 25, 2019 (EP) ..................... 19211284

(51) Int. Cl.
*G02B 1/00* (2006.01)
*G02F 1/1335* (2006.01)
*G03H 1/02* (2006.01)

(52) U.S. Cl.
CPC ....... *G02B 1/002* (2013.01); *G02F 1/133504* (2013.01); *G03H 1/0244* (2013.01)

(58) Field of Classification Search
CPC .... G02F 2202/30; G02F 1/292; G02F 1/1335; G02F 1/294; G02F 1/133565;
(Continued)

(56) References Cited

U.S. PATENT DOCUMENTS

2018/0241131 A1\* 8/2018 Akselrod ................. H01Q 3/44
2019/0196267 A1 6/2019 Yoo et al.
2019/0285798 A1\* 9/2019 Akselrod ............. G02B 6/1226

FOREIGN PATENT DOCUMENTS

CN 108873555 A 11/2018

OTHER PUBLICATIONS

Extended European Search Report mailed Apr. 22, 2020 in EP 19211284.5.
(Continued)

*Primary Examiner* — Mariam Qureshi

(57) ABSTRACT

An optical component comprising a planar metasurface arranged on a surface of a first substrate and a top layer arranged in a height direction Z above the metasurface, wherein the metasurface comprises a plurality of scattering structures, wherein a dielectric material is deposited on a subset of the plurality of scattering structures, wherein an active media is sandwiched between the metasurface and the top layer, wherein an incident electromagnetic radiation is transmitted or reflected by the optical component, wherein a phase profile modulation is induced on the incident electromagnetic radiation during the reflection or transmission.

20 Claims, 4 Drawing Sheets

Figure 1:
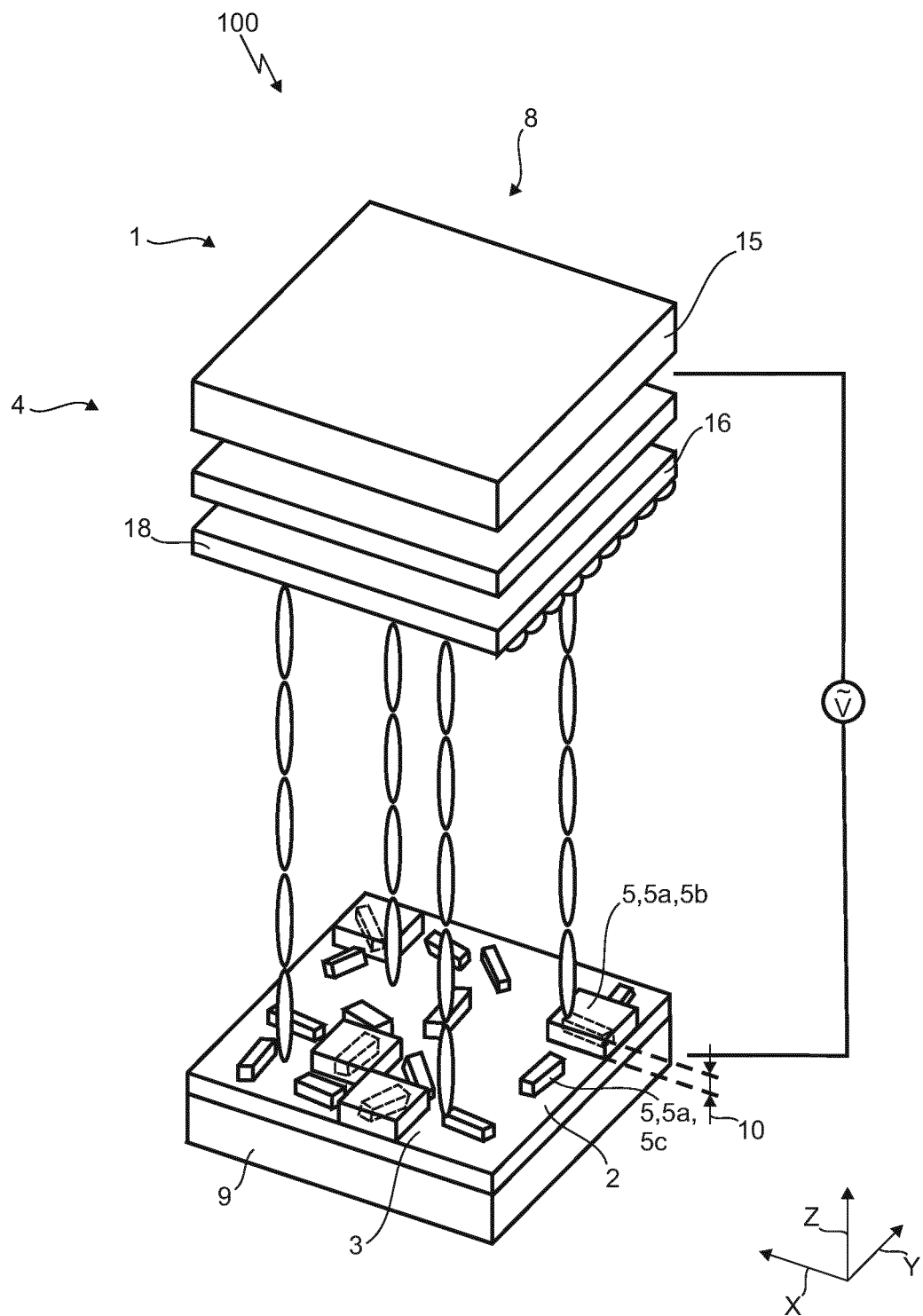

(58) Field of Classification Search
CPC ............... G02F 1/133504; G03H 1/22; G03H 2250/38; G03H 1/0244; G02B 1/002
See application file for complete search history.

(56) References Cited

OTHER PUBLICATIONS

International Search Report mailed Dec. 11, 2020 in International Application PCT/EP2020/082146.
Komar et al. "Electrical tuning of all dielectric metasurfaces" $10^{th}$ International Congress on Advanced Electromagnetic Materials in Microwaves and Optics—Metamaterials, Crete, Greece, Sep. 17-22, 2016.

* cited by examiner

ELECTRICALLY-CONTROLLED DYNAMIC OPTICAL COMPONENT COMPRISING A PLANAR METASURFACE

CROSS-REFERENCE TO RELATED APPLICATIONS

This application is a U.S. National Stage Application filed under 35 U.S.C. § 371 of International Application No. PCT/EP2020/082146, filed Nov. 13, 2020, which claims priority to European Application no. EP 19211284.5, filed Nov. 25, 2019. This application is hereby incorporated by reference in its entirety.

The propagation of a beam of light, or electromagnetic radiation, can be determined completely by its phase and amplitude profiles at a given two-dimensional surface. In order to manipulate such optical beams optical devices or optical components are used. Although a manipulation of the amplitude and the phase may be considered typical, a manipulation of the phase is preferred in order to avoid undesired losses. The propagation of the optical beams is manipulated by inducing upon them a specific phase profile. Such optical devices may be lenses, prisms, mirrors or holographic elements. Such a manipulation may be realized by thickness variations of the optical devices.

The conventional optical devices may be replaced by optical devices or components comprising metasurfaces. Metasurfaces are planar structures which can modulate the local properties of an optical beam. Typically, a metasurface is an artificial nanostructured interface that manipulates light by spatially arranged meta-atoms. These meta-atoms usually consist of plasmonic or dielectric nanoantennas, which can directly change light properties such as phase, amplitude, and polarization.

Metasurfaces provide a high resolution control over the phase profile of the optical beam. In particular, for holographic applications and beam shaping metasurfaces are advantageous.

However, the metasurfaces known in the prior art lack of the possibility of optical reconfigurability. Such an optical reconfigurability allows the control of certain properties and functionalities.

The object of the invention is to provide an optical component and an optical device, which overcomes the above-mentioned disadvantages.

The problem is solved by the optical component according to claim 1. The further dependent claims provide preferred embodiments.

According to the invention an optical component comprises a planar metasurface arranged on a surface of a first substrate and a top layer arranged in a height direction Z above the metasurface. The metasurface comprises a plurality of scattering structures, wherein a dielectric material is deposited on a subset of the plurality of the scattering structures, wherein an active media is sandwiched between the metasurface and the top layer, wherein an incident electromagnetic radiation is transmitted or reflected by the optical component, wherein a preferably switchable phase profile modulation is induced on the incident electromagnetic radiation during the reflection or transmission.

The scattering structures are also called meta atoms or building blocks of the metasurface. Advantageously the electromagnetic radiation has a wavelength $\lambda=10$ nm to 1000 nm. Preferably the electromagnetic radiation is in the infrared spectrum from about 700 nm to about 1000 nm). Preferably the electromagnetic radiation is in the visible spectrum from about 380 nm to 740 nm.

According to a preferred embodiment the scattering structures consist of a metal. Preferably the scattering structures consist of noble metal. Preferably the scattering structures consist of gold. Advantageously the scattering structures are deployed as optical antennas. Preferably, when the electromagnetic radiation strikes an individual scattering structure, it causes the charge present in the scattering structure to oscillate. This is called a surface plasmon. The interaction of the impinging electromagnetic radiation and the surface plasmon leads to a phase discontinuity. The electromagnetic radiation, which is transmitted through or reflected from the optical component undergoes therefore a phase jump.

Preferably, the scattering structures are in the form of rods. Further, it is preferred that the scattering structures are orientated in the plane of the metasurface. It is advantageous that the scattering structures comprise spatially varying (in plane-) orientations.

Further, it is preferred that the dimensions of the scattering structures are smaller than the wavelength of an incident electromagnetic radiation. The spacing between the scattering structures should be smaller than the wavelength $\lambda$ of the incident electromagnetic radiation to avoid diffraction effects. Thus, it is preferred that the spacing between the scattering structures is smaller than half of the wavelength $\lambda$ of the incident electromagnetic radiation. The spacing should also be sufficient so that near field mediated interactions are small. It is further advantageous that the scattering structures comprise identical geometric parameters. Preferably such geometric parameters comprise the shape and the dimensions of the scattering structures.

According to a preferred embodiment the phase profile, induced on the incident electromagnetic radiation, comprises a geometric phase component. Preferably, the geometric phase component is introduced due to a (local) phase retardation of the incident electromagnetic radiation. Advantageously the (local) phase retardation depends on the orientation of the scattering structures.

Such phase retardation is based on the Pancharatnam-Berry (PB) phase principle. The spatial control of the polarization state of light inevitably introduces nontrivial spatially-varying phase distributions, known as a PB phase. If two parts of a uniformly polarized wave are altered to a common polarization state along two different paths on the Poincaré sphere (polarization state space), a relative phase emerges between the two polarization states which is equal to half of the solid angle enclosed by the path. The PB phase represents the evolution of polarization conversion history, so the clockwise and anti-clockwise evolution would flip the sign of such a geometric phase. Thus, when a beam of circularly polarized (CP) light impinges upon a preferred scattering structure which is deployed as optical antenna with a preferred linearly polarized resonance (e.g. a dipole), the scattered beam is partially converted into the opposite helicity with a phase shift which is determined solely by the geometrical orientation of the antenna. Close to normal incident angles, a CP beam is primarily scattered into beams with identical polarization without phase change and to beams with the opposite circular polarization with a phase change corresponding to twice the angle formed between the dipole and a reference axis. Preferably, the normal incident axis is arbitrary. The sign of the phase shift depends on the helicity state of the impinging beam (either right- or left-handed helicity). On the other hand, the amplitude of the scattered field is preferably independent of the orientation of the scattering structure but rather on its frequency response. Advantageously the phase retardation depends exclusively on the orientation of the scattering structure.

Preferably, the geometric phase is unrelated to the dynamic (propagation) phase that accumulates along the optical propagation path of the electromagnetic radiation. Advantageously, the geometric phase modulation can be obtained by using anisotropic, subwavelength metallic/dielectric scattering structures with identical geometric parameters but spatially varying orientations. Preferably, the scattering structures are resonantly excited by the electromagnetic radiation. This bears the advantage of achieving a large scattering cross section.

Based on the principle of PB phase, the phase delay from each nanorod is equal to $2\varphi$, where $\varphi$ is the orientation angle of scattering structure. Thus, arbitrary phase profile is achieved by arranging the scattering structures with different orientations on the metasurface.

According to a further preferred embodiment the phase profile induced on the incident electromagnetic radiation comprises a propagation phase component. Preferably, the propagation phase component modulated by the dielectric material is deposited on a subset of the plurality of scattering structures and the refractive index of the active media. Preferably, the dielectric material is deposited on the scattering structures in the form of a dielectric pillar comprising a height along the height direction Z. Preferably the modulation of the propagation phase depends on the height of the dielectric pillar along the height direction Z. Preferably, the scattering structures are selectively covered with dielectric pillars by double electron-beam lithography.

According to a preferred embodiment the refractive index of the active media is tunable by an external input. Preferably the external input is an applied electric field. Preferably, the active media comprises liquid crystals. Preferably the active media comprises highly birefringent liquid crystals. Liquid crystals (LC) exhibit an anisotropy in the refractive index, which depends on the molecular orientation of the liquid crystals. This molecular orientation can be controlled with an electric field.

According to a further preferred embodiment the external input to tune the refractive index of the active media is electromagnetic radiation/light. Preferably the active media comprises spiropyran molecules. Spiropyran molecules exhibit photochromic features, which constitute a modulation of the refractive index due to incident light.

According to a further preferred embodiment the external input to tune the refractive index of the active media is a temperature change. Preferably the active media comprises vanadium dioxide and/or germanium antimony telluride.

According to a further preferred embodiment the metasurface is an array of scattering structures. Preferably the array is a repeating pattern of unit cells. Advantageously, a unit cell comprises at least two scattering structures. Preferably a first scattering structure is covered with the dielectric material or a dielectric pillar. Further, it is preferred that a second scattering structure in the unit cell is not covered with the dielectric material or a dielectric pillar. Preferably, the (in plane) orientation of the scattering structures of an individual unit cell of the array is varied. With other words the pattern does not replicate the orientation of the unit cells. This is particularly preferred, since due to the orientation of the scattering structures the geometric phase component may be modulated.

Preferably, one of the scattering structures in the unit cell is covered with the dielectric material in order to generate propagation phase difference between the two scattering structures. Advantageously a pattern of covering scattering structures with the dielectric material is determined by the relative location of two scattering structures in the unit cell.

According to a further preferred embodiment the optical component is an array of unit cells. It is advantageous that each unit cell is addressable by the external input. Preferably, the addressability is achieved by local control of the liquid crystals enabled by a thin film transistor (TFT).

Advantageously, the optical component may consist of an array of sub-wavelength pixels, which may be considered as the pixels of a phase mask. This means the optical component is divided into discrete pixels where each pixel provides a specific, local, phase shift indicated by $\varphi_{ij}$ which represents a discretized version of a phase map. For the shaping of an incident beam a phase profile $\varphi(x,y)$, $\varphi(x,y)$ is induced. Preferably, after the incident beam is reflected from or transmitted through the metasurface and propagates a distance z, its field profile is given by the Kirchhoff integral:

$$U_z(x, y) = e^{i\frac{\pi}{\lambda z}(x^2+y^2)} \int\int U_0(\xi, \eta) e^{i\frac{\pi}{\lambda z}(\xi^2+\eta^2)+i\varphi(\xi,\eta)} \exp\left[-i\frac{2\pi}{\lambda z}(\xi x, \eta y) d\xi d\eta\right]$$

$U_0$ is the field profile of the impinging beam, $\lambda$ is the wavelength, and $U_z$ is the field profile at distance z from the metasurface. Preferably, the pixels provide a phase shift between 0 and $2\pi$.

A preferred usage of the optical component is to design a hologram. This may for instance be realized by a Fourier hologram, which is designed to obtain the desired beam profile in the far field. Preferably, the required phase mask is the inverse Fourier transform of the desired image. The design of such a phase mask may require an iterative numeric approach. For optical devices with a more simple functionality such as lenses beam reflectors the pattern of the phase mask may be derived analytically. Further, the calculated phase map, which is found either numerically or analytically, is advantageously quantized. Once a quantized phase map is found, the pixels, i.e. the scattering structures, are deposited with an orientation/a dielectric pillar according to the required local phase shift.

According to a further preferred embodiment the top layer comprises a second substrate, which is coated with a metallic layer. Advantageously the second substrate is made of dielectric material. Preferably, the second substrate is made of glass. Preferably, the second substrate comprises a layer of rubbed polymide. Preferably, the layer of rubbed polymide is in contact with the liquid crystals of the active medium. Preferably, the initial alignment of the liquid crystals is induced by the contact with the layer of rubbed polymide. Preferably, the metallic layer is a indium tin oxide (ITO) layer. Advantageously, the first substrate is a silicone wafer. It is advantageous that the first substrate serves as a first electrode and the metallic layer serves as a second electrode. Preferably, an electric voltage is applicable on the two electrodes and an electric field is formed between the two electrodes.

According to a further preferred embodiment at least one spacer element is placed between the metasurface and the second substrate. Preferably, the spacer element is spherical. It is advantageous that the spacer element consists of silica.

Metasurfaces that shape light wavefronts via geometric phase, e.g., Pancharatnam-Berry (PB) phase can preferably be realized by controlling the in-plane orientations of optical antennas. This approach not only allows for highly precise control of the phase profile, but also alleviates the fabrication complexity. Importantly, the PB phase does not depend on the specific antenna design or wavelength, rendering broadband performance possible.

An advantageous selective combination of the geometric phase component and a propagation phase component on individual subwavelength pixels achieves a pixel-level addressability. This concept is universal and works for any active materials, which exhibit refractive index changes upon electrical, light, thermal, or other external stimuli.

Advantageously, the metasurface comprises scattering structures in the form of optical antennas that have been designed according to the PB phase. Preferably, at least one optical antenna is caged in a cell, which is filled with highly birefringent liquid crystals. Some of the antennas, i.e., subwavelength pixels, are selectively covered with dielectric pillars. This advantageously introduces an additional propagation phase on such pixels and meanwhile isolates them from the liquid crystals, deactivating the response of these pixels to electrical control. With proper phase-profile designs, completely interchangeable functionalities, for instance, switching between different holographic patterns within a hologram, or multi-function switching among beam steering, focusing, holography, optical vortices, etc., can be successfully implemented within milliseconds and with excellent reversibility under electrical control at visible frequencies.

The object is also addressed by an optical device comprising the optical component according to one of the previous embodiments, wherein an application of an electric field causes a modulation of an optical functionality of the optical device due to a modulated phase profile, induced on the incident electromagnetic radiation, which is transmitted through or reflected by the optical component. In particular, the modulation of the optical functionality is a switching between certain optical states.

The optical component could also be the entire optical device.

The optical device may comprise the single features or combinations of the features described above for the package or the optical component. Also, the optical component may comprise the single features or combinations of the features described for the optical device. Further, the same advantages may apply for the optical device as described above for the optical component and vice versa.

Preferably, the optical device is a holographic device or a lens or a beam steering device. With proper phase-profile designs, completely interchangeable functionalities, for instance, switching between different holographic patterns within a hologram, or multi-function switching among beam steering, focusing, holography, optical vortices, etc., can be successfully implemented within milliseconds and with excellent reversibility under electrical control at visible frequencies.

The optical device and the optical component feature great potentials to achieve diversified optical functions, while keeping individual functions highly independent within a single nanophotonic device. This will lead to novel optical communication systems using ultra-thin devices with high spatial resolution., which might bevery important for modern cryptography and security applications. Such highly integrated nanophotonic metasurfaces will allow for manipulation of light propagation at an unprecedented level, paving the avenue towards compact and multi-tasking optical devices.

Further advantages, aims and properties of the present invention will be described by way of the appended drawings and the following description.

Figure 2:
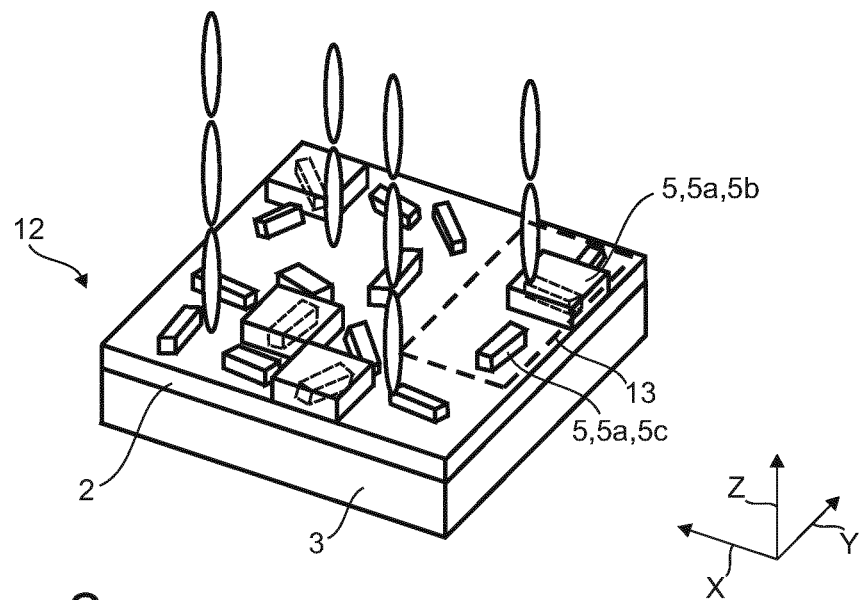
Figure 3:
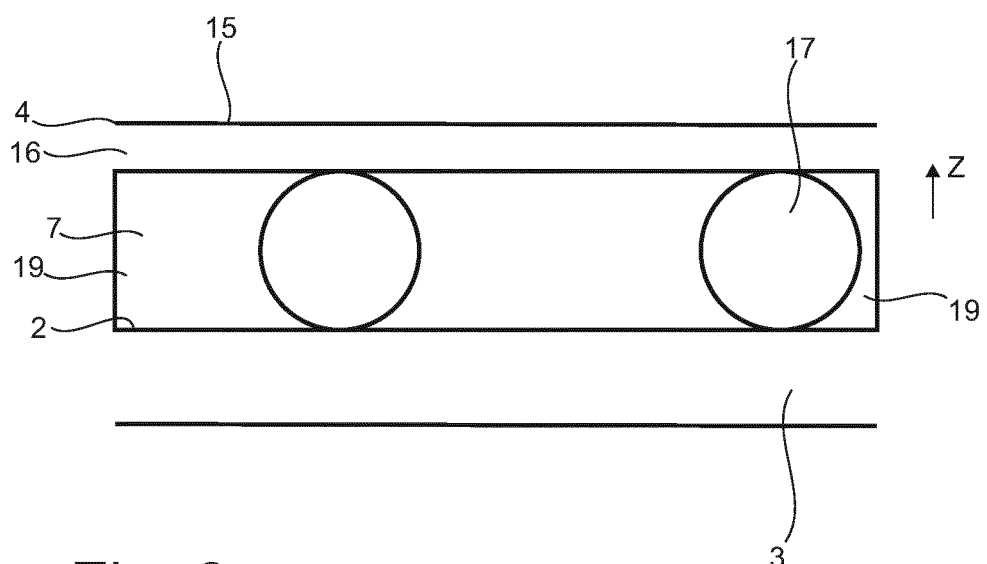
Figures 4, 5:
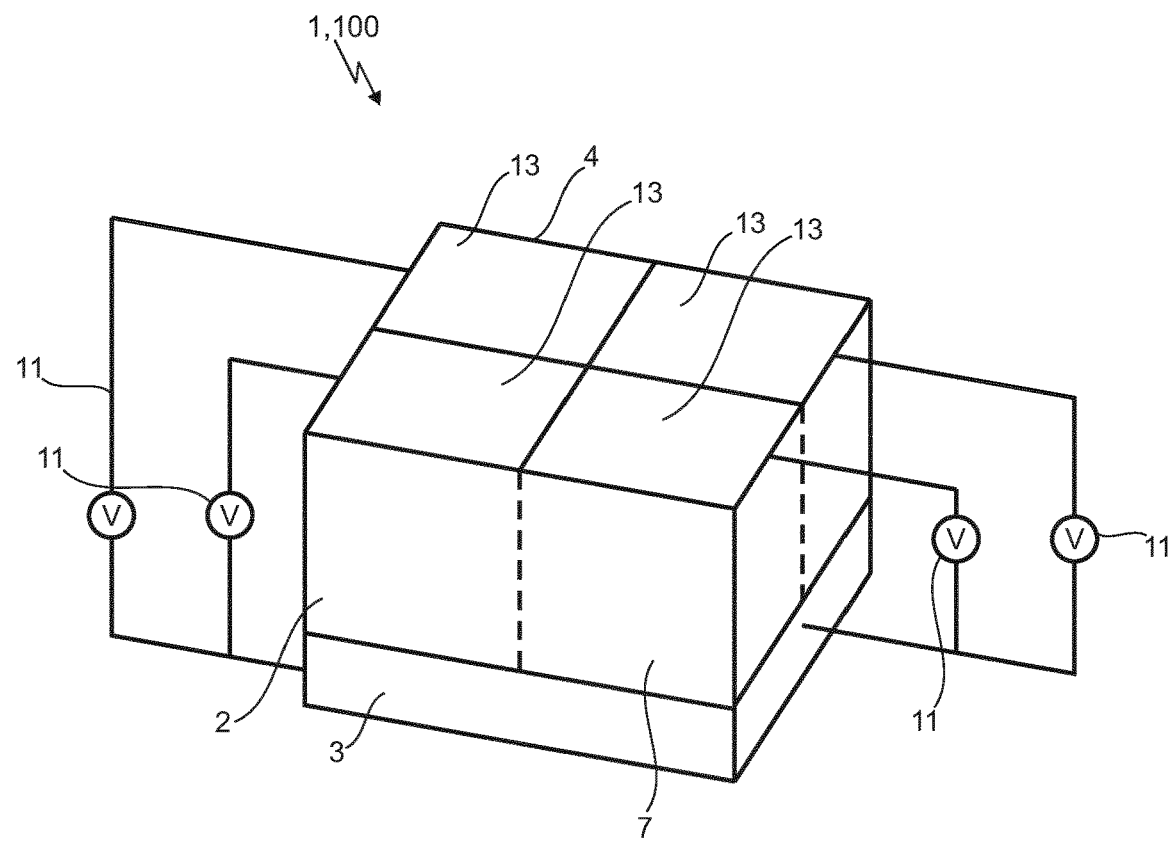
Figure 6:
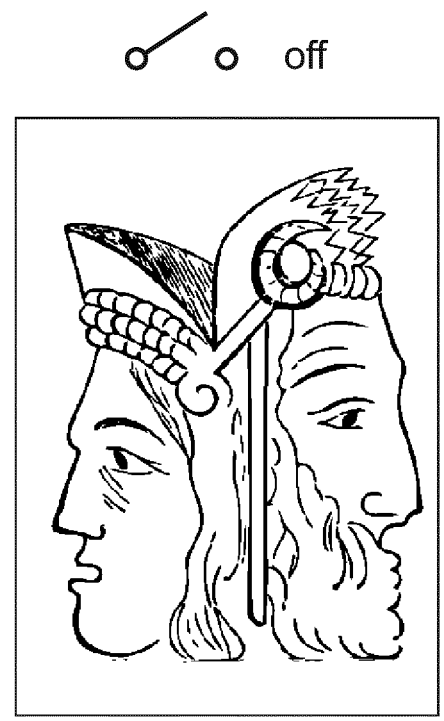
Figure 6:
Figure 6:
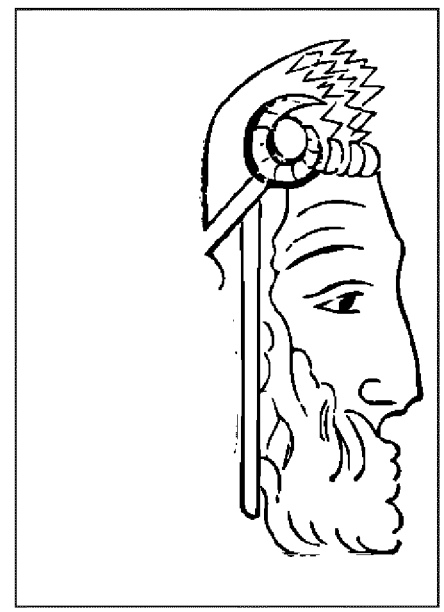

In the drawings:
FIG. 1 shows an optical component according to an embodiment
FIG. 2 shows a metasurface according to an embodiment;
FIG. 3 shows a side view of an optical component according to an embodiment;
FIG. 4 shows an optical component according to an embodiment
FIG. 5 shows a schematic of a phase mask;
FIG. 6 shows an example holographic pattern upon electrical control.

In the FIGS. 1 to 5 an optical component (1) is displayed comprising a planar metasurface (2) arranged on a surface of a first substrate (3) and a top layer (4) arranged in a height direction Z above the metasurface (2), wherein the metasurface (2) comprises a plurality of scattering structures (5, 5a, 5b, 5c), wherein a dielectric material (6, 6a) is deposited on a subset of the plurality of scattering structures (5, 5a, 5b, 5c), wherein an active media (7) is sandwiched between the metasurface (2) and the top layer (4), wherein an incident electromagnetic radiation (8) is transmitted or reflected by the optical component (1), wherein a phase profile modulation is induced on the incident electromagnetic radiation during the reflection or transmission.

The optical device extends along a height direction Z a two in-plane directions X, Y. The metasurface (2) extends in the plane spanned by the two in-plane directions X, Y.

The scattering structures (5, 5a, 5b, 5c) consist of a metal, in particular gold, and are deployed as optical antennas (5a) in the form of rods. The rods are orientated in the plane of the metasurface (2) with spatially varying in plane orientations The dimensions of the scattering structures (5, 5a, 5b, 5c) are smaller than the wavelength $\lambda$ of an incident electromagnetic radiation (8). Further, the spacing (9) between the scattering structures (5, 5a, 5b, 5c) is smaller than half of the wavelength $\lambda$ of the incident electromagnetic radiation (8). Additionally, the scattering structures (5, 5a, 5b, 5c) comprise identical geometric parameters.

For an electromagnetic radiation (8) with a wavelength of $\lambda=633$ nm, the scattering structures (5, 5a, 5b, 5c) in the form of gold nanorods, which are employed as optical antennas, have an optimal dimension of 200 nm*80 nm. The spacing (9) between scattering elements is 300 nm, which is smaller than half of the wavelength of the incident electromagnetic radiation. The dimension of the optical antennas (5a) is optimized in order to achieve the maximum reflection efficiency under the incident wavelength of 633 nm.

The top layer (4) comprises a second substrate (16), which is coated with a metallic layer (15). The second substrate is made of dielectric material, preferably glass, and the metallic layer (15) is a indium tin oxide (ITO) layer. Further, a layer of rubbed polymide (18) may be provided at the second substrate (16).

The active media in the form of liquid crystals are held in cell. The liquid crystal (LC) cell is constructed by sandwiching the LC between the first substrate (3) with the metasurface (2) and a glass substrate. Between the metasurface (2) and the top layer (4) at least one spacer element (17) is placed, which is spherical and consists of silica. This is depicted in FIG. 3. The silica sphere is employed as spacer to fix the inside thickness of the LC cell to 5 µm. A highly birefringence (Hi-Bi) LC with ne=1.92 and no=1.53 at the operating wavelength of 633 nm is placed inside the cell in direct contact with the metasurface. The high birefringence (Hi-Bi) LC is encapsulated inside the cell and is in direct contact with the metasurface (2). On the sides of the optical component (1) seals (19) might be provided to seal the cell.

The refractive index of the active media (7) in the form of high birefringence liquid crystals is tunable by an external input (11), wherein the external input (11) is an applied electric field. The first substrate (3) serves as a first electrode and the metallic layer (15) serves as a second electrode, wherein an electric voltage is applicable on the two electrodes. The electric field does not influence on the optical properties of optical antennas (5a). The electric field might have a possible value of 4 V/µm. Of course, it is conceivable that an external input of a different nature like a temperature change or an incident electromagnetic radiation is applied.

The phase profile, induced on the incident electromagnetic radiation (8), comprises a geometric phase component and a propagation phase component. The geometric phase component is introduced due to a phase retardation of the incident electromagnetic radiation (8), which depends on the orientation of the scattering structures (5, 5a, 5b, 5c). Based on the principle of PB phase, the phase delay from each scattering structures (5, 5a, 5b, 5c) is equal to 2φ, where φ is the orientation angle of the scattering structures (5, 5a, 5b, 5c). Thus, arbitrary phase profile is achieved by arranging the scattering structures (5, 5a, 5b, 5c) with different orientations on the metasurface (2).

The propagation phase component is modulated by the dielectric material (6, 6a), which is deposited on a subset of the plurality of scattering structures (5, 5a, 5b, 5c) and the refractive index of the active media (7). The dielectric material (6, 6a) is deposited on the scattering structures (5, 5a, 5b) in the form of a dielectric pillar (6a), comprising a height (10) along the height direction Z. The modulation of the propagation phase component depends on the height (10) of the dielectric pillar (6, 6a) along the height direction Z.

The metasurface (2) is an array (12) of scattering structures (5, 5a, 5b, 5c). The array (12) is a repeating pattern of unit cells (13). A unit cell (13) comprises at least two scattering structures (5, 5a, 5b, 5c), wherein a first scattering structure (5, 5a, 5b) is covered with the dielectric material (6, 6a) and a second scattering structure (5, 5a, 5c) is not covered with the dielectric material (6, 6a). There are two nanorods (5a) in each unit cell (13), which are vertical to each other. One of the nanorods (5a, 5b) is covered with the dielectric material (6, 6a) in order to generate propagation phase, which is different between two nanorods (5, 5a, 5b, 5c). Therefore, the pattern of covering with the dielectric pillar (6, 6a) is determined by the relative location of two nanorods (5, 5a, 5b, 5c) in the unit cell (13).

The dielectric material (6, 5a) covering the scattering structures (5, 5a, 5b) is used to introduce propagation phase on certain optical antennas (5, 5a, 5b). Thus, propagation phase difference is generated between the optical antennas with (5, 5a, 5b) and without (5, 5a, 5c). covering. Such phase difference could be adjusted by changing the orientation of the surrounding liquid crystal molecules (7) due to an appropriate external input (11), for instance an electric field.

The optical component (1) can be designed as an array of unit cells (13). Each unit cell (13) is addressable by the external input (11) and comprises at least one scattering structure (5, 5a, 5b, 5c). This is depicted in FIG. 4. Addressability is achieved by local control of liquid crystal.

The unit cells (13) may be considered as the pixels of a phase mask (20). This means the optical component (1) is divided into discrete pixels where each pixel provides a specific, local, phase shift indicated by $\varphi_{ij}$ which represents a discretized version of a phase map (20), depicted in FIG. 5. For the shaping of an incident beam a phase profile $\varphi(x,y)$, $\varphi(x,y)$ is induced. Preferably, after the incident beam is reflected from or transmitted through the metasurface (2) and propagates a distance z.

The selective combination of the geometric phase component and a propagation phase component on individual subwavelength pixels achieves a pixel-level addressability. This concept is universal and works for any active materials, which exhibit refractive index changes upon electrical, light, thermal, or other external stimuli.

The metasurface (2) comprises scattering structures (5, 5a, 5b, 5c) in the form of optical antennas (5a) that have been designed according to the PB phase. At least one optical antenna is caged in a cell (13), which is filled with highly birefringent liquid crystals (7). Some of the antennas (5a) are selectively covered with dielectric pillars (6a). This introduces an additional propagation phase on such scattering structures (5, 5a, 5b) and meanwhile isolates them from the liquid crystals (7), deactivating the response of these scattering structures (5, 5a, 5b) to electrical control.

The optical component (1) could be comprised in an optical device (100). The optical component (1) might also be an optical device (100). An application of an electric field causes a modulation of an optical functionality of the optical device (100) due to a modulated phase profile of an incident electromagnetic radiation (8), which is transmitted through or reflected by the optical component (1).

The phase profile consists of geometric phase and propagation phase. The geometric phase profile is a static part, which depends on the orientation of optical antenna. The propagation phase profile is achieved by the dielectric materials covering a liquid crystal layer, which could be switched by applying electric field to adjust refractive index of liquid crystal. Thus, the switching is realized due to the changeable phase profile.

With proper phase-profile designs, completely interchangeable functionalities, for instance, switching between different holographic patterns within a hologram, or multi-function switching among beam steering, focusing, holography, optical vortices, etc., can be successfully implemented within milliseconds and with excellent reversibility under electrical control at visible frequencies. In FIG. 6 an example of a switching of holographic patterns within a hologram upon electrical control is depicted.

This invention features great potentials to achieve diversified optical functions, such as optical switch for communication systems and dynamic holographic for data storage.

All the features disclosed in the application documents are claimed as being essential to the invention if, individually or in combination, they are novel over the prior art.

LIST OF REFERENCE NUMERALS 1 optical component
2 pump signal generator
3 first substrate
4 top layer
5 scattering structures
5a optical antennas
6 dielectric material
6a dielectric pillar
7 active media
8 electromagnetic radiation
9 spacing between scattering structures
10 height of the dielectric pillar
11 external input
12 array of scattering structures
13 unit cell 15 metallic layer
16 second substrate
17 spacer element
18 layer of rubbed polymide
19 seal
20 phase mask
X in-plane direction
Y in-plane direction
Z height direction

The invention claimed is:

1. An optical component comprising a planar metasurface arranged on a surface of a first substrate and a top layer arranged in a height direction Z above the metasurface,
wherein the metasurface comprises a plurality of scattering structures, wherein a dielectric material is deposited on a subset of the plurality of scattering structures, wherein an active media is sandwiched between the metasurface and the top layer, wherein an incident electromagnetic radiation is transmitted or reflected by the optical component, and wherein a phase profile modulation is induced on the incident electromagnetic radiation during the reflection or transmission.

2. The optical component according to claim 1, wherein the phase profile modulation is a switchable phase profile modulation.

3. The optical component according to claim 1, wherein the scattering structures are deployed as optical antennas in the form of rods, which are orientated in the plane of the metasurface, wherein the scattering structures comprise spatially varying orientations, wherein the dimensions of the scattering structures are smaller than the wavelength A of an incident electromagnetic radiation, wherein the spacing between the scattering structures is smaller than half of the wavelength A of the incident electromagnetic radiation, and wherein the scattering structures comprise identical geometric parameters.

4. The optical component according to claim 3, wherein the scattering structures consist of a metal.

5. The optical component according to claim 3, wherein the scattering structures consist of gold.

6. The optical component according to claim 1, wherein the phase profile modulation, induced on the incident electromagnetic radiation, comprises a geometric phase component, wherein the geometric phase component is introduced due to a phase retardation of the incident electromagnetic radiation, and wherein the phase retardation depends on the orientation of the scattering structures.

7. The optical component according to claim 1, wherein the phase profile modulation, induced on the incident electromagnetic radiation, comprises a propagation phase component,
wherein the propagation phase component is modulated by the dielectric material, which is deposited on a subset of the plurality of scattering structures, and the refractive index of the active media,
wherein the dielectric material is deposited on the scattering structures in the form of a dielectric pillar, comprising a height along the height direction Z, and wherein the modulation of the propagation phase component depends on the height of the dielectric pillar along the height direction Z.

8. The optical component according to claim 1, wherein the refractive index of the active media is tunable by an external input, wherein the external input is an applied electric field, and wherein the active media comprises highly birefringent liquid crystals.

9. The optical component according to claim 8, wherein the external input to tune the refractive index of the active media is electromagnetic radiation.

10. The optical component according to claim 8, wherein the external input to tune the refractive index of the active media is a temperature change.

11. The optical component according to claim 1, wherein the metasurface is an array of scattering structures, wherein the array is a repeating pattern of unit cells, wherein a unit cell comprises at least two scattering structures, wherein a first scattering structure is covered with the dielectric material, and wherein a second scattering structure is not covered with the dielectric material.

12. The optical component according to claim 11, wherein the optical component is an array of unit cells, wherein each unit cell is addressable by the external input.

13. The optical component according to claim 1, wherein the top layer comprises a second substrate, which is coated with a metallic layer, wherein the second substrate is made of dielectric material, wherein the first substrate serves as a first electrode and the metallic layer serves as a second electrode, and wherein an electric voltage is applicable on the two electrodes.

14. The optical component according to claim 1, wherein the second substrate is made of glass.

15. The optical component according to claim 1, wherein the metallic layer is an indium tin oxide (ITO) layer.

16. The optical component according to claim 1, wherein at least one spacer element is placed between the metasurface and the top layer.

17. The optical component according to claim 16, wherein the at least one spacer element is spherical.

18. The optical component according to claim 17, wherein the at least one spacer element consists of silica.

19. An optical device comprising the optical component according to claim 1, wherein an application of an electric field causes a modulation of an optical functionality of the optical device due to a modulated phase profile of an incident electromagnetic radiation, which is transmitted through or reflected by the optical component.

20. An optical device according to claim 19, wherein the optical device is a holographic device or a lens or a beam steering device.

* * * * *